UNITED STATES PATENT OFFICE.

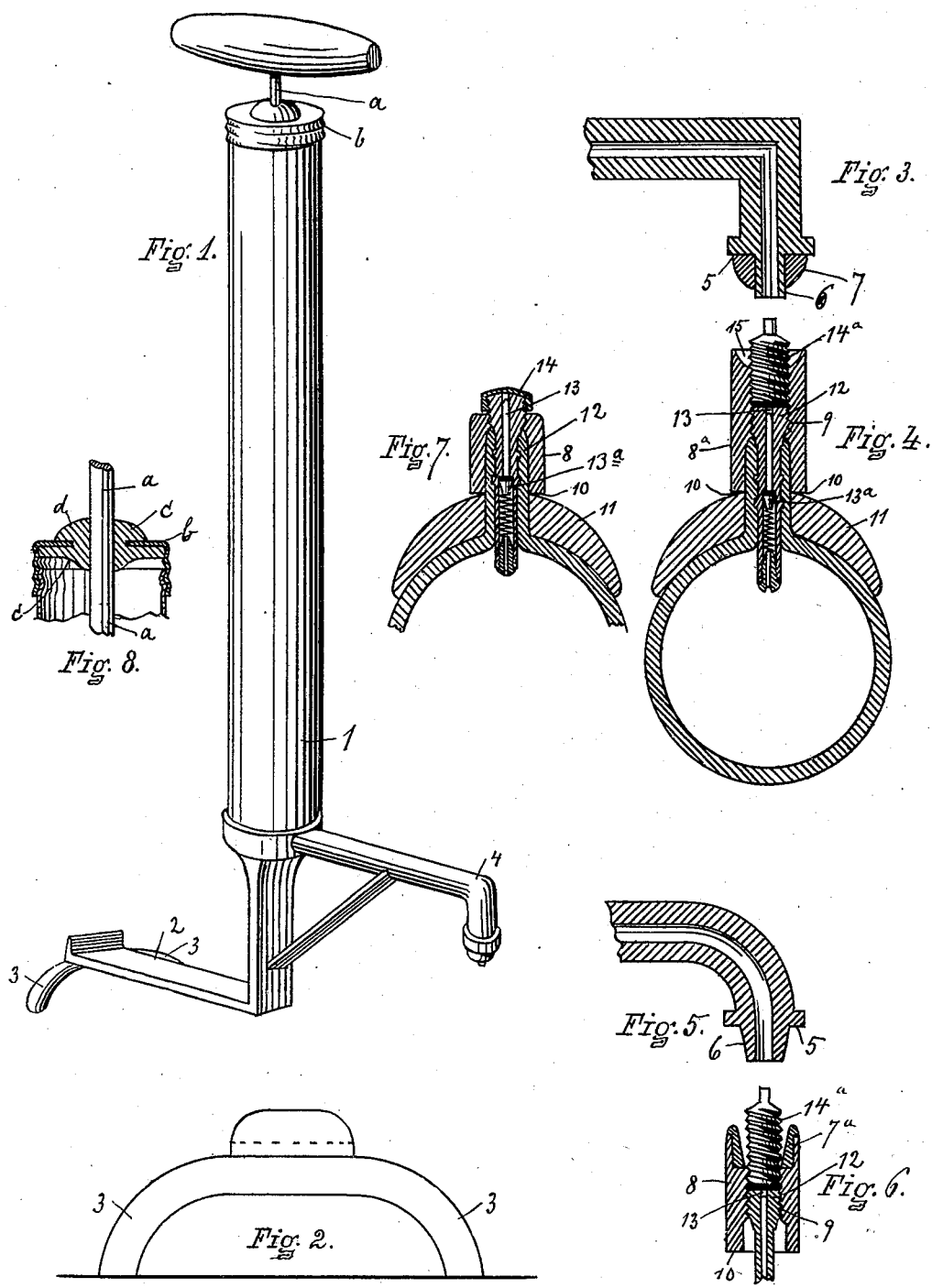

EDWARD GABEL, OF UTICA, NEW YORK.

TIRE-VALVE SUPPORT AND AIR-PUMP.

SPECIFICATION forming part of Letters Patent No. 639,552, dated December 19, 1899.

Application filed August 31, 1899. Serial No. 729,025. (No model.)

*To all whom it may concern:*

Be it known that I, EDWARD GABEL, a citizen of the United States of America, and a resident of Utica, county of Oneida, New York, have invented certain new and useful Improvements in Tire-Valve Supports and Air-Pumps, of which the following is a specification.

My invention relates to an improvement in tire-valve supports for pneumatic tires for vehicles and in the air-pump used for such purposes.

In the drawings, Figure 1 illustrates a side or perspective view of a bicycle-pump. Fig. 2 represents the end view of the legs and foot-rest. Fig. 3 is a sectional view of a pump-nozzle and the packing, the broken lines indicating parts removed. Fig. 4 is a cross-section of bicycle tire-valve, nipple and tire-valve support, and plug, the plug being shown in full lines. Fig. 5 is a section of a portion of pump-nozzle. Fig. 6 is a sectional view of my valve-support, the tire-valve stop, and the packing. Fig. 7 is a cross-section of a portion of the tire-valve, the tire-valve support, its rim, and the cap. Fig. 8 is a vertical section of the pump-cap, broken lines indicating parts removed, together with a section of the piston of the pump.

Similar numerals refer to corresponding parts in the several views.

Having described my invention by reference to the figures in the drawings, I will now proceed to describe the same more minutely.

In forcing air into a pneumatic tire of a vehicle there is great danger of displacing the tire-valve and its connection to the tire. The tire-valve being unsupported, when pressure is placed on the neck of the valve or nipple great danger arises in weakening the tire-valve seat in its connection to the tire itself, as the operator of the pump is frequently careless in placing too much pressure on the tire-valve, which crowds the same down, thereby displacing the tire from its connection to the rim and weakening the connection so as to frequently produce a leak.

The object of my invention is to support the tire-valve or nipple by physical mechanism in its normal position when the pump is applied and to provide a packing between the tire-valve support and the pump by means of which the tire can be supplied with air with the least possible danger to the tire itself.

I accomplish the result heretofore particularly specified by using an ordinary air-pump 1, having a foot-rest 2, with legs 3 on the outside of the foot-rest for holding the pump steady on the ground or other place where the pump is located when the operation of supplying air to the pneumatic tire is carried on. The pump has nozzle 4, with shoulder 5 at its outer end, with rabbeted surface 6 for supporting elastic packing 7 on the end of the pump-nozzle. The elastic packing may be conical shape or oval, the packing being arranged either on the nozzle of the pump or in the tire-valve support, as illustrated at $7^a$ in Fig. 6, the elastic packing being arranged either on the pump-nozzle or in the neck of the tire-valve support, whichever may be found most desirable. The tire-valve support 8 is tubular in shape, provided with a tube in a portion of its length with screw-threads 9. The lower end of the tire-valve support is provided with shoulders 10, which rest on the convex surface of rim 11 when screwed down on screw-threaded nipple 12 of the tire-valve stem. By this arrangement the neck of the tire-valve can be moved from side to side to accommodate the connection made between the pump-nozzle and the tire-valve opening. By placing the tire-valve support on the screw-threaded nipple of the tire-valve and turning the same down onto the tire the tire-valve is always maintained in its normal position from down pressure when the pump is applied, and by this arrangement leakage and tendency to rupture to the tire is reduced to the minimum.

The tire-valve support after the pneumatic tube has been charged with the requisite quantity of air may be removed from the nipple and a plug or cap placed in or over opening 13 of the tire-valve.

The air-plug of the tire-valve in the drawings is shown at $13^a$, Fig. 4, it being understood that it is the ordinary tire-valve. In the drawings plug $14^a$ is shown inserted in the tire-valve support, as illustrated in Fig. 4, the end of the plug being suitably packed with elastic material, so that its end rests on the end of the tire-valve nipple for preventing the escape of the air in the event of leakage of the valve. If elastic packing 7 on the nozzle of the pump is to be inserted in the neck of the tire-valve support, then concave end 15 of the tubular tire-valve support 8ª, which in this instance is somewhat elongated, Fig. 4, should be provided to enable the elastic packing to fit into the neck of the tire-valve support and make a positive union to prevent the escape of air when the pump is operated. If the elastic packing is placed in the neck of the tire-valve support, as illustrated in Fig. 6, then the nozzle of the pump should be made tapering or convex, as best illustrated in Fig. 5.

When the tire-valve support 8 is placed on the screw-threaded nipple of the tire-valve and seated on the rim of the tire, the pump-nozzle can then be inserted in the neck of the valve-support, where the valve itself is maintained in its normal physical position. When the pressure of the foot is applied to the pump, no care need be exercised by the operator in holding the pump in a fixed position on the neck of the valve-support, thereby making the union of the nozzle of the pump and the tire-valve support perfect, so that when the requisite quantity of air is inserted in the tire by removing the pump and inserting the screw-threaded plug in the tire-valve support a complete check on the tire-valve is maintained; but if the operator prefers to remove the tire-valve support when the tire is sufficiently charged with air he can do so and put either a cap, as illustrated in Fig. 7, on the neck of the tire-valve, or he can apply a plug on the inside to close the neck of the tire in any way he may choose.

For preventing piston $a$ of the pump from wearing in cap $b$ of the pump I place in the opening in the cap a lead packing $c$, which is perforated through its center for the passage of piston $a$ and is held in position by running the lead on either side of the opening in the cap $b$, as best illustrated in Fig. 8. By this arrangement the piston of the air-pump will always run in lead packing and prevent either squeak or excessive wear on the pump-cap or on the piston. It should be borne in mind that the lead packing is formed by shoulders $d$ and $e$ on either side of the opening of cap $b$, which always maintains the same in its proper position when the pump is operated.

What I claim as new, and desire to secure by Letters Patent, is—

1. A pneumatic tire having an externally-screw-threaded air-valve, extending through the rim, in combination with a tubular screw-threaded tire-valve support, an air-pump nozzle and a rubber packing between the pump-nozzle and the tire-valve support, for the purposes stated.

2. A vehicle-tire having an air-chamber and an air-valve in combination with a rim with the valve extending through the rim, a tubular support surrounding the neck of the air-valve with its lower end resting on the rim, an air-pump having a nozzle for supplying air to the tire, and a rubber packing between the nozzle of the air-pump and the tire-valve support, for the purposes stated.

3. The combination of a pneumatic tire having an air-valve screw-threaded upon its outer side extending through the rim, the rim having a convex surface with an opening through the rim for the passage of the neck of the tire-valve, a screw-threaded tire-valve support, an air-pump having a nozzle, the packing interposed between the nozzle of the air-pump and the neck of the valve-support, for the purposes stated.

4. A pneumatic tire having an air-valve extending from its surface provided with screw-threads upon its outer side in combination with a rim to receive the tire provided with an opening through the rim for the passage of the air-valve, a tubular tire-valve support provided with screw-threads on its inner surface, the nozzle of an air-pump and an elastic packing between the nozzle of the pump and the tubular tire-valve support, substantially as set forth, for the purposes stated.

5. In an air-pump, the combination of the foot-rest provided with legs and a nozzle, the valve-support fitting over the tire-valve and resting on the rim, the elastic packing between the nozzle of the pump and the valve, for supplying the tire with air, substantially as set forth.

6. A pneumatic tire having an air-valve the valve being screw-threaded on its outer side, in combination with a tire-rim, having an opening for the receipt of the screw-threaded tire-valve, a tubular tire-valve support screw-threaded on its inner side, a screw-threaded plug to fit the screw-threaded opening in the tire-valve support, and an elastic packing between the plug and the upper surface of the tire-valve for the purposes stated.

Signed by me at Utica, New York, this 26th day of August, 1899.

EDWARD GABEL.

Witnesses:
 PHEBE A. TANNER,
 MORRIS P. RICHARDS.